(No Model.)

D. LUMBERT.
CRANBERRY PICKER.

No. 433,177. Patented July 29, 1890.

Attest:
A. N. Jesbera
E. M. Watson

Inventor:
Daniel Lumbert
By David A. Burr
Atty.

UNITED STATES PATENT OFFICE.

DANIEL LUMBERT, OF CENTREVILLE, MASSACHUSETTS.

CRANBERRY-PICKER.

SPECIFICATION forming part of Letters Patent No. 433,177, dated July 29, 1890.

Application filed November 21, 1889. Serial No. 331,122. (No model.)

*To all whom it may concern:*

Be it known that I, DANIEL LUMBERT, of Centreville, in the county of Barnstable and State of Massachusetts, have invented certain new and useful Improvements in Cranberry-Pickers; and I do hereby declare that the following is a full and exact description thereof, reference being had to the accompanying drawings, and to the letters of reference marked thereon, making a part of this specification.

My invention relates to an improvement in devices for picking cranberries of the class in which the berries are stripped from the vines by means of a fork; and it consists in a novel construction and arrangement of a revolving oscillating front-plate with the receptacle and its fork, whereby the vines are prevented from slipping off of the fork in the process of stripping them, substantially as is hereinafter described and claimed.

Figure 1:
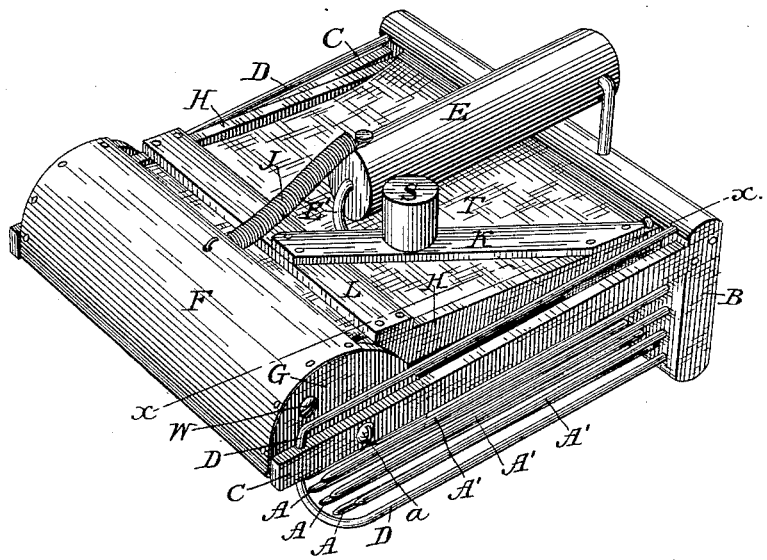
Figure 2:
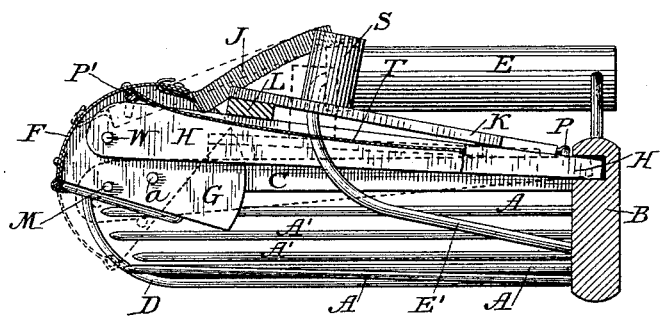

In the accompanying drawings, Figure 1 is a view in perspective of my improved cranberry-picker having a revolving front plate; Fig. 2, an irregular vertical section in line $xx$ of Fig. 1, showing the front plate elevated with its depression illustrated by dotted lines.

The device is constructed of a fork whose rods or tines form the bottom of a receptacle in which the berries stripped from the vines drawn through the fork are caught and held. The tines of the fork consist of a series of parallel wire rods A A, of equal length, secured at their inner ends to the lower portion of a transverse plate B, which constitutes the rear end of the receptacle. Preferably the inner ends of the rods are inserted in said rear plate near to its lower edge in two proximate lines parallel with said edge, so that the inner end of every alternate rod shall be in the one line and of the remainder in the other, (see Fig. 2,) thereby increasing slightly the interval between them. The free front ends of the rods are, however, brought to a common plane.

The sides of the receptacle are each formed of a single bar C, secured rigidly to the upper portion of the approximate end of the rear plate B, to project therefrom parallel, or nearly so, with the rods A A of the fork, and of a series of parallel wire rods A' A', interposed between the fork and bar, and secured in like manner at their inner ends to the end of the rear plate B.

The front end of each side bar C is made to project beyond the fork-rods A A, and is stayed by means of a wire D, led from the top of the rear plate longitudinally over the cross-bar to its outer end, and which, being bent down to pass through an aperture in the bar, is curved back under the side rods and extended in the plane of the fork-rods A A, back to the rear plate, to be secured thereto. These stay-wires D D thus serve as a definite margin for each end of the receptacle, as well as a support for the main side bars C C.

The receptacle is provided, as usual, with a central handle E, secured at one end mediately or immediately to the middle of the upper edge of the rear plate B, to extend thence forward over the fork, its front end being supported by a bent wire E', extending back to the lower portion of the rear plate.

The front of the receptacle is closed by a transversely-curved stripping-plate F, secured at either end to the periphery of a semicircular disk G, centrally pivoted at $a$ to each side bar C in such position that the rods A A of the fork shall be tangential to the circles described by the peripheries of the disks and the periphery of the plate be in line with the outer ends of the side bar. The stripping-plate F is thus left free to revolve about the axis of the two disks, so that its lower edge may by a revolution of the disks be brought into close proximity to the front ends of the rods of the fork and parallel therewith. This stripping-plate may be made of tin or other sheet metal, and its lower edge is preferably wired—*i. e.*, bent over a longitudinal wire to re-enforce and strengthen it. It is made to turn forward to close against the end of the fork by means of two lateral actuating-bars H H, whose rear ends rest loosely in slots or recesses cut in the upper portion of the rear plate B, and whose front ends are severally pivoted eccentrically at W to the inner face of each disk G, near to the periphery thereof, at a point which, when the lower front edge of the stripping-plate is elevated to the level of the side bars C C, will be slightly above said bars, as shown in Fig. 2 of the drawings.

It is automatically swung or turned to its upper or open position by means of a spiral spring J, secured at one end to the front end of the handle E and at the other to the proximate edge of the stripping-plate F.

The two reciprocating actuating-bars H H are connected to move in unison by means of a cross-bar L, extending from the one to the other just in front of the handle E.

The forward movement of the stripping-plate F is arrested when its lower front edge is in close proximity to the ends of the rods A A in the fork by means of stop-pins M M, projecting from the inner face of each disk G in position to strike against the under side of each actuating-bar H.

To facilitate the operation of the actuating-bars, a thumb-piece K is extended diagonally from the inner end of one of them to the middle of the cross-bar L, and a button S is fitted thereon in position to be within ready reach of the thumb on the hand grasping the handle E.

The top of the receptacle may be closed by means of a piece of flexible material stretched from a cross-rod P, connecting the rear ends of the actuating-bars to a second rod P', connecting their front ends under the segmental stripping-plate F.

It is evident that other forms of springs than that described may be employed to produce an automatic action of the front stripping-plate, although the use of a spiral spring in manner as set forth constitutes a simple and efficient expedient for the purpose.

In the use of the device the receptacle is pushed under and among the fruit-bearing vines, whose stems are carried thereby between the rods A A of the fork, and when the receptacle is full the stripper F is caused to revolve upon its axis by means of a depression of the actuating-bars H H, produced by a pressure of the operator's thumb upon the button S, until the front edge of the stripper has closed against the front ends of the rods, so as to prevent the vines from slipping off therefrom, whereupon, by drawing the fork away from the vines, the berries too large to pass between the rods are stripped from the vines and retained in the receptacle.

I claim as my invention—

1. The combination, in a cranberry-picker, with its fork and receptacle constructed substantially as described, and with a rotating transversely-curved spring-actuated stripper mounted at the front of the receptacle to swing to and from the front end of the fork, of longitudinally-reciprocating actuating-bars pivoted at one end to the stripper, and a thumb-piece connected with said bars to facilitate their depression, substantially in the manner and for the purpose herein set forth.

2. The combination, in a cranberry-picker, with its fork and receptacle constructed substantially as described, of the rotating segmental disks pivoted to the side bars of the receptacle, near its front end, the stripping-plate secured to said disks and connecting them, the spring governing the stripping-plate, the reciprocating actuating-bars severally pivoted eccentrically to each disk and connected to move in unison, and the thumb-piece, by means of which said bars are depressed, substantially in the manner and for the purpose herein set forth.

In testimony whereof I have signed my name to this specification in the presence of two subscribing witnesses.

DANIEL LUMBERT.

Witnesses:
GEO. H. HINCKLEY,
HARRIE F. LUMBERT.